United States Patent
Ponzo De Siqueira

(10) Patent No.: US 7,861,996 B2
(45) Date of Patent: Jan. 4, 2011

(54) ADAPTER DEVICES FOR SECURING AN AIRCRAFT PASSENGER SEAT TO AN AIRCRAFT FUSELAGE SEAT TRACK

(75) Inventor: Fernando Antonio Ponzo De Siqueira, Sao Jose dos Campos (BR)

(73) Assignee: Embraer—Empresa Brasileira de Aeronautica S.A., Sao Jose Dos Campos—SP (BR)

(*) Notice: Subject to any disclaimer, the term of this patent is extended or adjusted under 35 U.S.C. 154(b) by 0 days.

(21) Appl. No.: 12/576,228

(22) Filed: Oct. 8, 2009

(65) Prior Publication Data

US 2010/0025557 A1 Feb. 4, 2010

Related U.S. Application Data

(60) Division of application No. 11/701,542, filed on Feb. 2, 2007, now Pat. No. 7,607,736, which is a continuation-in-part of application No. PCT/BR2005/000069, filed on May 4, 2005.

(30) Foreign Application Priority Data

Aug. 3, 2004 (BR) .................................... 0403587

(51) Int. Cl.
*A47B 97/00* (2006.01)
*B64D 13/00* (2006.01)

(52) U.S. Cl. ................. 248/503.1; 248/500; 244/118.6; 244/122 R; 410/105

(58) Field of Classification Search .............. 248/503.1, 248/503, 501, 500; 244/118.5, 118.6, 122 R; 411/85; 410/102, 105
See application file for complete search history.

(56) References Cited

U.S. PATENT DOCUMENTS

| | | | |
|---|---|---|---|
| 4,062,298 A | 12/1977 | Weik | |
| 4,109,891 A * | 8/1978 | Grendahl | 248/503.1 |
| 4,230,432 A | 10/1980 | Howell | |
| 4,256,424 A | 3/1981 | Knox et al. | |
| 4,496,271 A | 1/1985 | Spinosa et al. | |
| 4,509,888 A | 4/1985 | Sheek | |
| 4,796,837 A | 1/1989 | Dowd | |
| 4,911,381 A | 3/1990 | Cannon et al. | |
| 5,083,726 A | 1/1992 | Schurr | |
| 5,236,153 A | 8/1993 | LaConte | |
| 5,520,357 A | 5/1996 | Payne et al. | |
| 5,765,978 A | 6/1998 | Looker et al. | |
| 5,823,727 A * | 10/1998 | Lee | 411/85 |
| 6,260,813 B1 | 7/2001 | Whitcomb | |
| 6,619,588 B2 | 9/2003 | Lambiaso | |
| 7,232,096 B1 * | 6/2007 | Ahad | 244/118.6 |
| 2007/0063122 A1 | 3/2007 | Bowd et al. | |

* cited by examiner

*Primary Examiner*—Anita M King
(74) *Attorney, Agent, or Firm*—Nixon & Vanderhye P.C.

(57) ABSTRACT

Adapter devices are provided that, when installed on an aircraft seat track break area, allow for the installation and/or positioning of passenger seats thereat. The devices include a main body having two portions. One end of the portion is integrated to a fork-shaped part 2 which defines a half-opening 3. Close to the end of the other portion there is provided a pair of half-tabs which are symmetrically disposed in relation to one another on each side of the body. Pairs of symmetrically disposed semi-circular tabs are provided on the main body. Threaded pass-through holes are located one of the body portions so as to threadably accommodate retaining discs in the form of screw screws heads provided with screws which are installed in the threaded holes.

7 Claims, 8 Drawing Sheets

ADAPTER DEVICES FOR SECURING AN AIRCRAFT PASSENGER SEAT TO AN AIRCRAFT FUSELAGE SEAT TRACK

CROSS-REFERENCE TO RELATED APPLICATIONS

This application is a divisional of commonly owned U.S. application Ser. No. 11/701,542, filed Feb. 2, 2007, now U.S. Pat. No. 7,607,736, which is a continuation-in-part of and claims domestic priority benefits under 35 USC §120 from International Application PCT/BR2005/000069 filed on May 4, 2005, which in turn claims priority benefits under 35 USC §119 from Application PI 0403587-9 filed in Brazil on Aug. 3, 2004, the entire contents of each prior application being expressly incorporated hereinto by reference.

FIELD OF THE INVENTION

Devices are disclosed that allow for the installation and/or positioning of aircraft passenger seats especially at the division/break areas of the seat tracks.

BACKGROUND OF THE INVENTION

Passenger seats are usually installed fixedly on tracks inside the aircraft fuselage. Due to reasons associated with assembly, maintenance, and handling, the seat tracks are typically divided into segments which are installed adjacently in the same alignment, but usually without a break/division on the interface among them. There is typically therefore a break/division area between these adjacently aligned track segments. However, there is also typically no structural continuity between these adjacently aligned track segments which would otherwise provide for proper and sufficient resistance characteristics as well as proper load distribution for installation of seats on such seat track break/division areas.

When arranging aircraft interiors, the passenger seats are positioned in such a manner that the fixation point of the seat to the seat track structure does not coincide with any track division/break areas that exist in the passenger compartment inside the aircraft fuselage. This limitation on the location of the passenger seats when installed therefore does not allow for many optimal or ideal interior arrangements. As such, the limitation on the passenger seat location does not fully fulfill the needs of the aircraft operators.

Other fixation devices for aircraft passenger seats are already known, especially those proposed in the following US patents: U.S. Pat. Nos. 5,520,357, 6,619,599, 4,796,837, 5,083,726 and 4,509,888. However, such known devices are not destined for installation in the aircraft seat track break/division areas thus impeding installation and/or positioning of passenger seats at that location.

More specifically, U.S. Pat. No. 5,520,357 presents a device for fixation of a galley wall or bulkhead to the aircraft that substantially differs from the mechanical fixation device for seats of the present invention. U.S. Pat. No. 5,520,357 shows an attachment plate which has attachment feet/anchor fastened through screws, wherein an attachment box is attached to the attachment plate. However, as the screws are the elements fastening the attachment feet/anchor, they are susceptible to vibration of the aircraft in flight which can cause them to become loose thereby not offering sufficient safety during use.

U.S. Pat. No. 4,796,837 presents a support comprising a metal body having a wall which projects from a flat base, with tabs for fixation to the track, yet comprising a leg holding section and a yoke mounting section, both for fixation of the seat leg. Therefore, the disclosed support constitutes a complex piece composed by several parts integrated into the metal body which does not allow for the installation/adaptation of several different types of seat legs, thus lacking versatility in use.

U.S. Pat. Nos. 5,083,726 and 4,509,888, like U.S. Pat. No. 4,796,837, also have its supports in single piece, having a body integrated to a fixation section of the seat leg and to tabs for fixation to the track. The above comments are also valid with respect to such supports, with U.S. Pat. Nos. 5,083,726 and 4,509,888 lacking use versatility, and impeding the installation/adaptation of several types of seat to the supports.

None of the devices known from the above cited patents therefore allow its supports to be installed on the seat track division/break areas.

SUMMARY OF THE INVENTION

It would therefore be highly desirable if an alternative for this undesired restriction could be provided, specifically a device guaranteeing greater flexibility in the installation of the passenger seats within the aircraft fuselage. Devices which fulfill such needs have now been provided herein which represent an innovation in the aeronautical industry.

The devices disclosed herein, when installed in the seat track break/division areas, provide proper and sufficient resistance characteristics and load distribution thereby making it possible to install aircraft passenger seats on these seat track break/division areas which meets the structural requirements during all operational conditions of the aircraft, including flight and soil loads, and emergency landings (impacts). If such a device has fixation tabs integrated into a body structure, such as a single piece, then such an arrangement constitutes a greater safety for fixation to the track.

It is therefore an object of the invention to supply a simple and efficient device capable of fastening the feet of aircraft passenger seats to seat tracks, especially at the division/break areas of tracks, located on the floor of the aircraft fuselage. The devices of the present invention are thereby intended to provide enhanced safety in accordance with safety standards mandated by FAR 23 and 25 (Federal Aviation Regulations, Part 23 and Part 25) and RBHA part 23 and part 25 (Regulamento Brasileiro de Homologação Aeronáutica—Brazilian Regulations for Aeronautical Approval).

According to an embodiment of the invention, an adapter device for fastening passenger seats onto a seat track break in an aircraft is provided. The adapter device includes fastening means to fasten the adapter device to the seat track, especially at the seat track break area between of two seat track segments. The adapter device can be assembled either on a lateral seat track or on a floor track of the aircraft. The adapter device is composed of a main body having opposed end portions joined to each other. The end of the portion is integrated to a fork-shaped part which defines a half-opening. Close to the end of the end portion there is at least a pair of half-tabs. The remainder of main body has at least a pair of tabs.

The fixation means of the adapter may comprise at least a retaining disc joined to a screw part which is installed in a threaded pass-through hole on the main body. Alternatively, other fixation components different from said such a retaining disc with screw part can be used, such as cotters, key lockers, rivets, and others.

A front adapter device will have its fork-shape part and the half-opening defined thereby in the shape of a semi-circle. A rear adapter device may be structurally similar to the front device but instead can have a different geometric format of the fork-shaped part 2 and its defined half-opening 3. Specifically, the rear adapter device can have a rounded rectangular shaped half-opening. In addition, the rear adapter device can have tabs 4 which have a more prolonged rectangular shape.

According to the present invention, when the front foot of a passenger seat is positioned so as to coincide with a division/break of the seat track, two adapting devices may be necessary, one symmetrically disposed in opposition to the other, so that the fork-shaped part of one engages the fork-shaped part of the other. In such a manner, the half-openings of each fork-shaped part of the two devices D will be joined so as to form a circular opening which surrounds a pin associated with the front foot of a passenger seat.

The assembly sequence of the front foot of the seat in a front adapter device may thus include position and fasten a rear one of the adapter devices on the track (the adapter device that will be under the leg of the seat), install the seat so that it is positioned appropriately on the seat track, and position and fasten the front one of the adapter devices on the track (i.e., the adapter device that will be exposed forwardly of the leg of the seat).

The assembly of the rear foot of the passenger seat requires only one of the aft adapter devices. The assembly sequence for such an after adapter device may include position and fasten the aft adapter device onto the track, and install the passenger seat appropriately positioning the rear foot thereof in the adapter device w.

BRIEF DESCRIPTION OF THE DRAWINGS

For a better understanding of the devices for installation of aircraft passenger seats of the present invention, reference will be made below to the accompanying drawings, wherein.

DETAILED DESCRIPTION OF THE INVENTION

Figure 1:
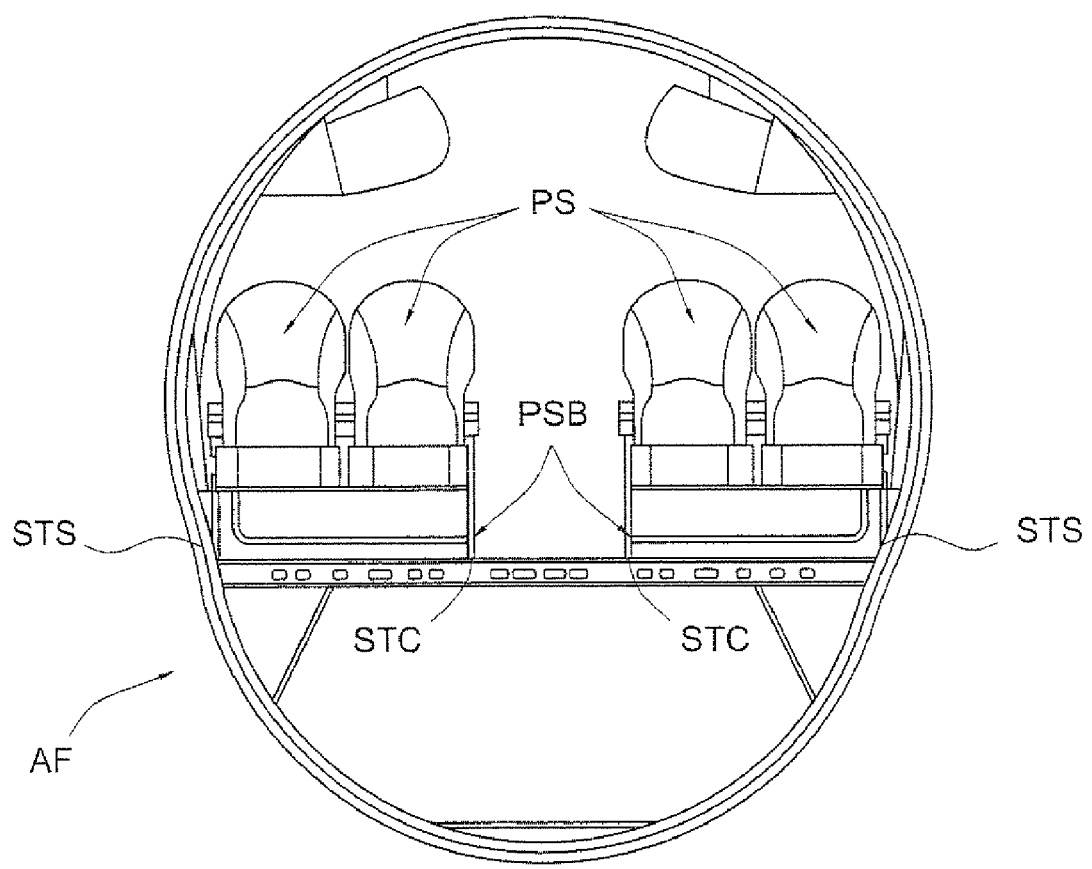
FIG. 1 is a cross-sectional view of an aircraft fuselage illustrating the location of the seat tracks therein and the passenger seats positionally fixed thereto.

As shown in accompanying FIG. 1, an aircraft fuselage AF is generally provided with four tracks for fastening the passenger seats PS, namely left and right sidewall seat tracks STS, and central tracks STC of the left and right floor. The passenger seat bases PSB are fastened and/or installed through four points, which are typically known in art parlance as the seat foot SF which includes an upright aluminum fixing pin P (see FIG. 2). The rear foot is typically inserted on the track through two buttons and through the fixing pin P. The front foot is typically inserted through a single fitting and fixed through a fixing nut.

It is known that if the passenger seat PS is installed in such way that at least one fixation point of the seat foot SF coincides with the seat track break area STB between aft and forward seat track sections $STC_a$, $STC_f$, respectively (see FIG. 2), the seat does not fulfill all structural requirements mandated by applicable regulations (e.g., FAR 23 and 25 and RBHA part 23 and 25. However, according to the present invention, the forward and aft adapter devices $D_f$ and $D_a$, respectively, which are installed at the seat track break STB make it possible for the installation of the seat foot SF to be accomplished which will guarantee the approval of the passenger seat PS in according to FAR 23 and 25 and RBHA 23 and 25.

The adapter devices $D_f$ and $D_a$ of the present invention are essentially parts fastened to the seat track by a lock on the track break area STB. They can be assembled either on the lateral or side seat tracks STS or on the floor tracks STC of the aircraft fuselage AF. The shape of the adapter devices $D_f$ and $D_a$ of the present invention is such that they each fit into the seat tracks and locked therein by a specially configured screw retaining disc D. In especially preferred embodiments, two types of adapter devices are provided by the present invention, namely a device $D_f$ destined to be positioned at the front foot of the passenger seat, and a device $D_a$ destined to be positioned at the rear foot of the passenger seat. Both adapter devices $D_f$ and $D_a$ are structurally very similar to one another, with only a few dimensional differences therebetween that will be explained below.

Figure 2:
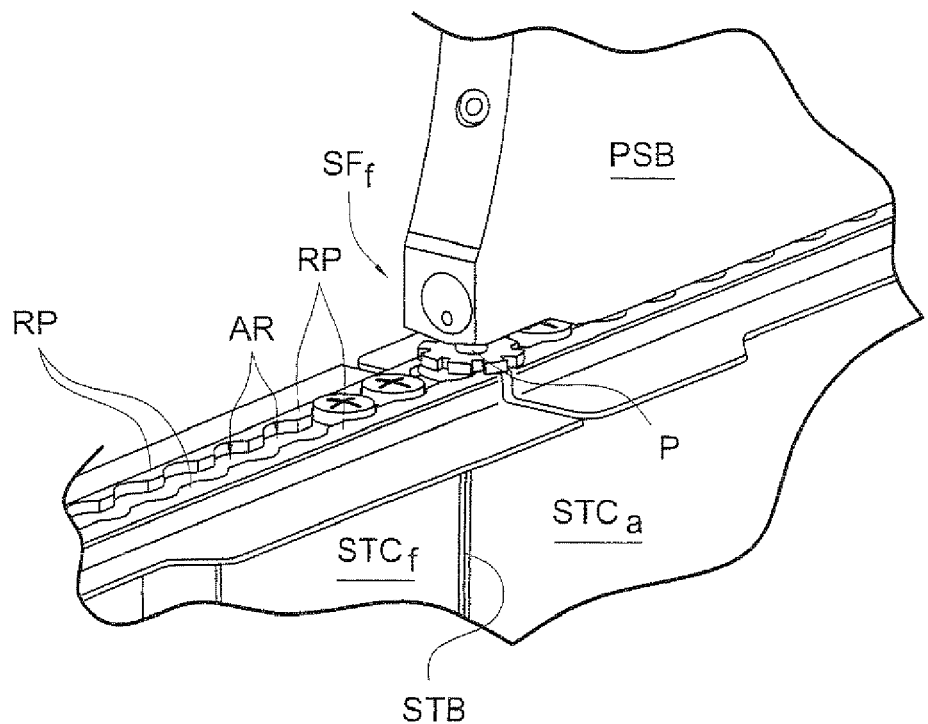
FIG. 2 is an enlarged perspective view showing an exemplary front passenger seat foot installed at a track break between an opposed pair of forward adapter devices according to an embodiment of the present invention.
Figure 3:
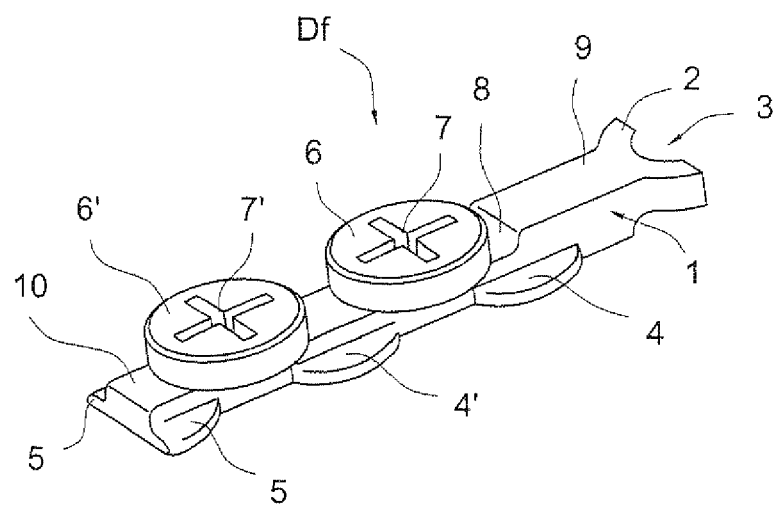
FIG. 3 is an upper side rear end perspective view of a forward adapter device according to an embodiment of the present invention.
Figure 4:
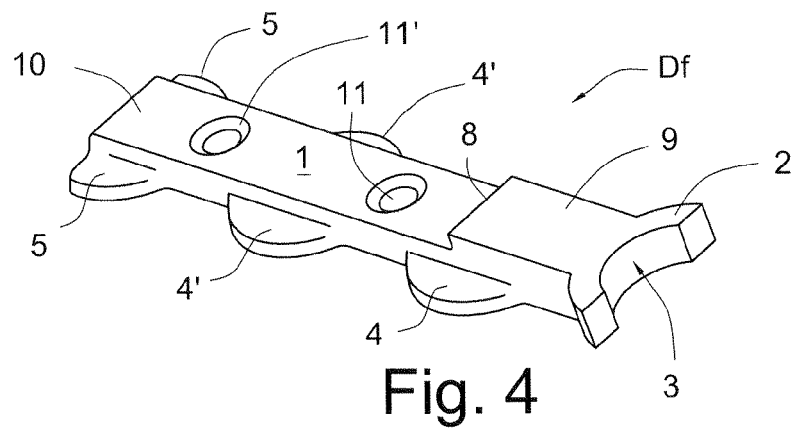
FIG. 4 is an upper side front end perspective view of the forward adapter device as shown in FIG. 3 but with the screw retaining discs omitted therefrom for clarity of presentation.
Figure 5:
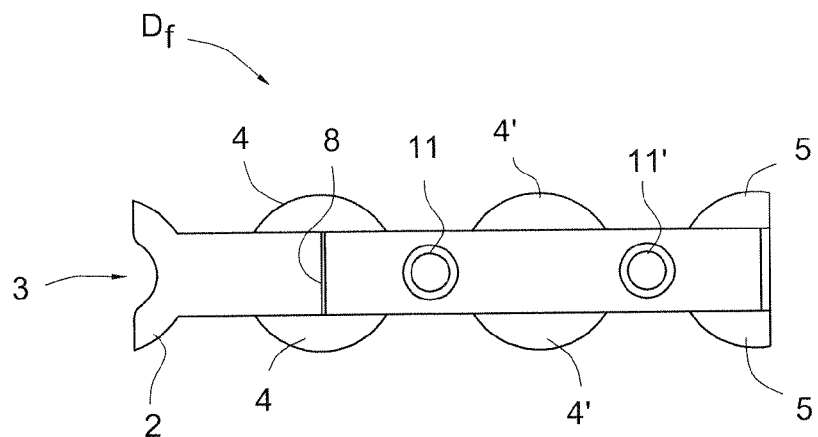
FIG. 5 is a top plan view of the forward adapter device as shown in FIG. 4.

FIGS. 3-5 show a forward adapter device $D_f$ in accordance with an embodiment of the present invention. In this regard, device $D_f$ includes a generally rectangular main body 1 having opposed end portions 9, 10. The end portion 9 has a rectangular cross-section which is larger than the rectangular cross-section of the end portion 10. The end portions 9, 10 are joined on the body 1 by a ramp step 8. The terminal end of the end portion 9 is configured into a semi-circular fork-shaped part 2 which defines a semi-circular half-opening 3. Close to the end of the end portion 10 there is a pair of half-tabs 5 which are semi-circularly shaped and are symmetrically disposed in relation to one another. On each side of the body 1, close to the area where the end portions 9, 10 are joined to the main body 1, there is a pair of semi-circular tabs 4 which are disposed symmetrically in relation to one another on each side of the body 1. In a similar manner, in the intermediate position between end portions 9 and 10, and between the pairs of half-tabs 5 and the semi-circular tabs 4, there is another pair of semi-circular tabs 4' which are symmetrically disposed in relation to one another on each side of the body 1. The tabs 4, 4' and half-tabs 5 are aligned in the same horizontal plane so that the fork-shaped part 2 and its defined half-opening 3 are parallel to such plane so as to be capable of insertion into the access regions AR and within the channel TC defined by the seat tracks $STC_f$ and $STC_a$ (see FIG. 2). The tabs 4, 4' and half-tabs 5 may thus be moved so as to be engaged by the retaining portions RP of the seat tracks $STC_f$ and $STC_a$ located between adjacent ones of the access regions AR.

Located above the end portion 10 of the body 1, there are provided two screw retaining discs 6, 6' each having a central cross cavity 7, 7', respectively. The retaining discs 6, 6' are respectively located on the body 1 between and above the pairs of tabs 4, 4' and the pair of half-tabs 5 and are parallel to the horizontal plane thereof but disposed.

FIGS. 4 and 5 present respective views of the forward adapter device $D_f$ in such a manner that the retaining disc parts 6, 6' are removed so as to reveal threaded pass-through holes 11, 11' located on the end portion 10 between the pairs of tabs 4, 4' and the pair of half-tabs 5. The retaining discs 6, 6' are actually screw heads having a screw part which is respectively installed in the threaded holes 11, 11' of the device $D_f$. A screwdriver with a cross-shaped tip (Philips type) may thus be engaged with each cross cavity 7 to allow installation of the disc parts 6, 6' in the threaded holes 11, 11'. The function of the retaining discs 6, 6' is to lock the entire device $D_f$ (and therefore a passenger seat) on the seat track in the longitudinal direction of the aircraft. Such locking is accomplished by threading the screws of the retaining discs 6, 6' in the holes 11, 11', respectively of body 1 so that the retaining discs 6, 6' are engaged within respective ones of the generally circularly shaped access regions AR defined by a conventional seat track (see FIG. 2).

Figure 6:
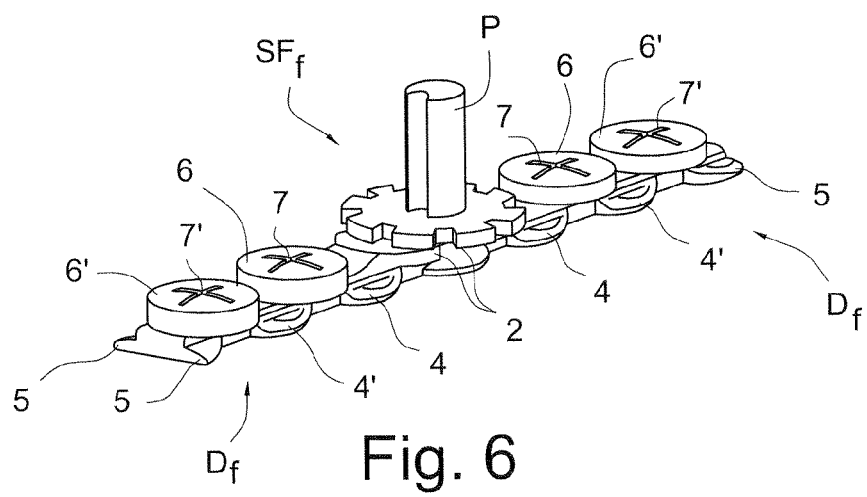
FIG. 6 is a perspective view showing an assemblage of the front seat foot pin fixedly positioned between an opposed pair of forward adapter devices according to an embodiment of the present invention.
Figure 7:
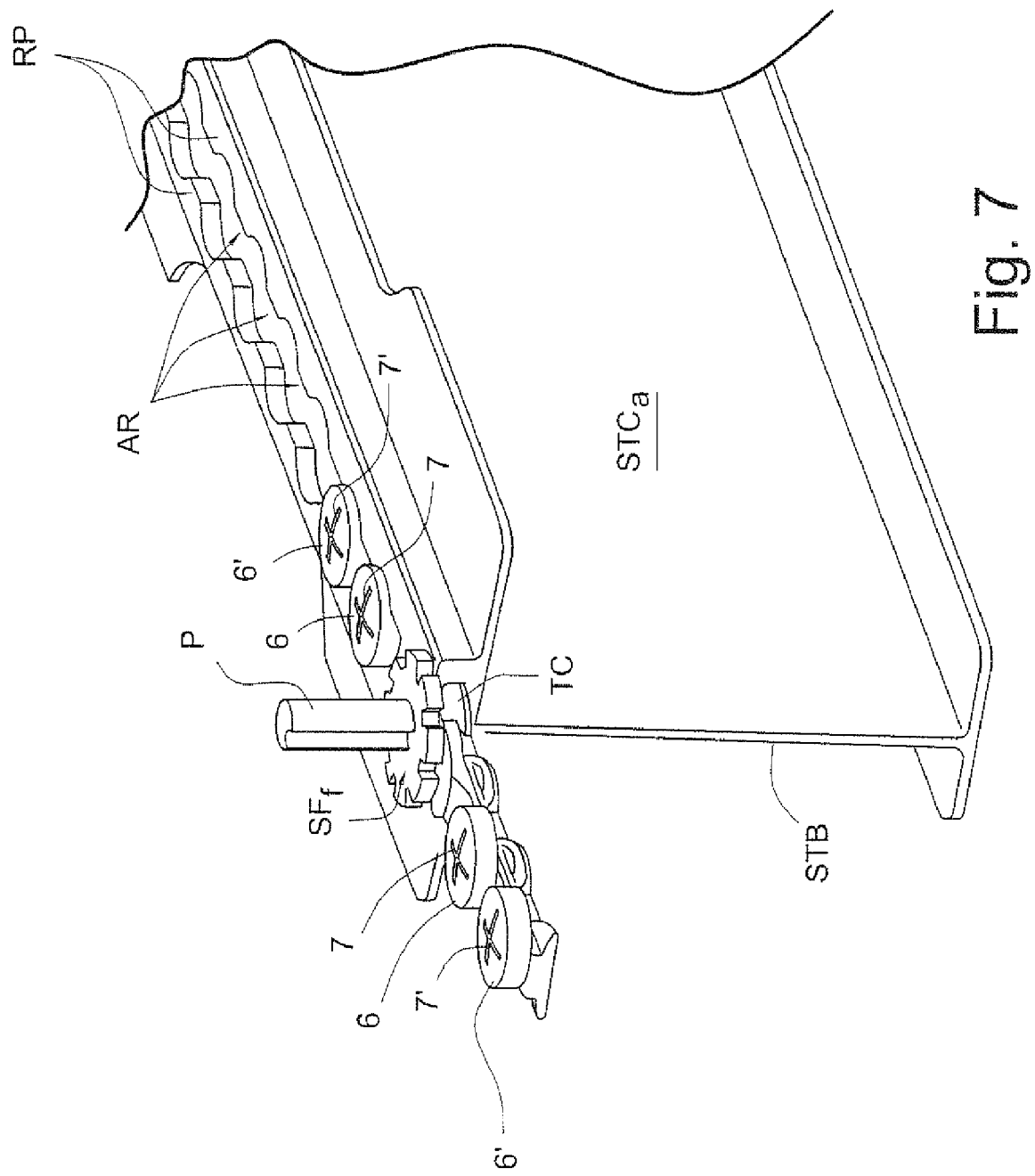
FIG. 7 is a perspective view similar to FIG. 2 but showing only the aft section of the seat track with the seat foot pin fixedly positioned between an opposed pair of forward adapter devices according to an embodiment of the present invention.

FIGS. 6 and 7 depict the assembly sequence of the front foot $SF_f$ of a passenger seat PS in forward and aft seat track sections $STC_f$ and $STC_a$ with an opposed pair of forward adapter devices $D_f$ of the present invention. In this regard, when the front foot $SF_f$ of the seat PS is positioned so as to coincide with a seat track break STB, two adapting devices $D_f$ are necessary, one of which is symmetrically disposed in relation to the other. As shown in FIG. 6, the semi-circular part 2 of one device $D_f$ engages the semi-circular part 2 of the other device D, so that both respective half-openings 3 of the two devices $D_f$ are joined together to form a circular opening which surrounds the pin P that is component part of the front foot SF of the seat.

FIG. 7 represents the assemblage of components shown in FIG. 6 fitted on an aft seat track section $STC_a$ having respective typical supporting structure (it being noted here that the adjacent forward track section $STC_f$ was omitted in FIG. 7 for better clarity of presentation). Thus, with such an assemblage of components, a passenger seat base PSB can be attached to the pin P of the front foot $SF_f$ as depicted in FIG. 2. Even though the illustrations here are schematic presentations, it will be noticed that there is not need of any disassembly or modification of the seat/armchair for installation on the seat track break area STB when the adapting devices $D_f$ of the present invention are utilized.

The assembly sequence of the adapting devices $D_f$ is summarized below:

1. position and fasten a rearward one of the adapter devices $D_f$ on the track (i.e., the device $D_f$ that will be under the leg of the seat);

2. install the seat in the track and position the seat as appropriate along the track;

3. position and fasten the front one of the adapter devices $D_f$ on the track (i.e., the device $D_f$ that will be exposed in front of the leg of the seat).

Figure 8:
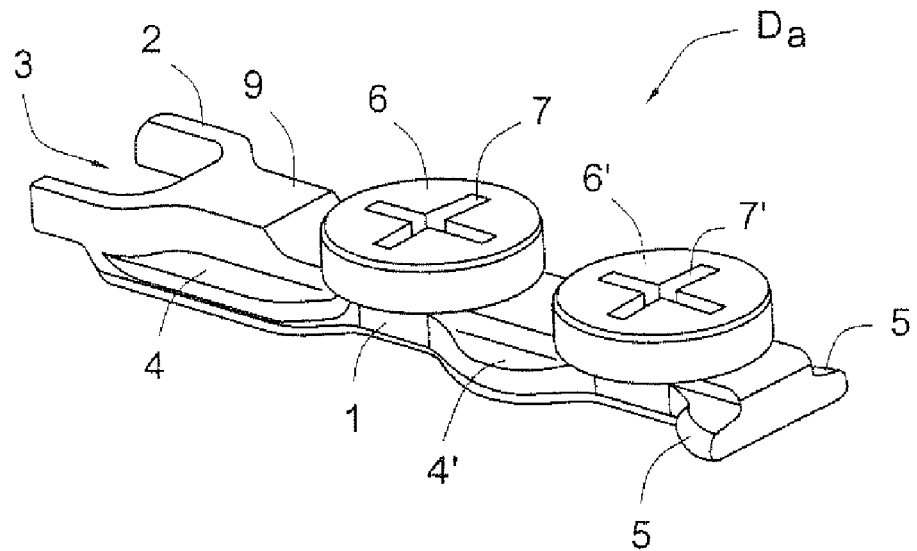
FIG. 8 is an upper side rear end perspective view of an aft adapter device according to an embodiment of the present invention.
Figure 9:
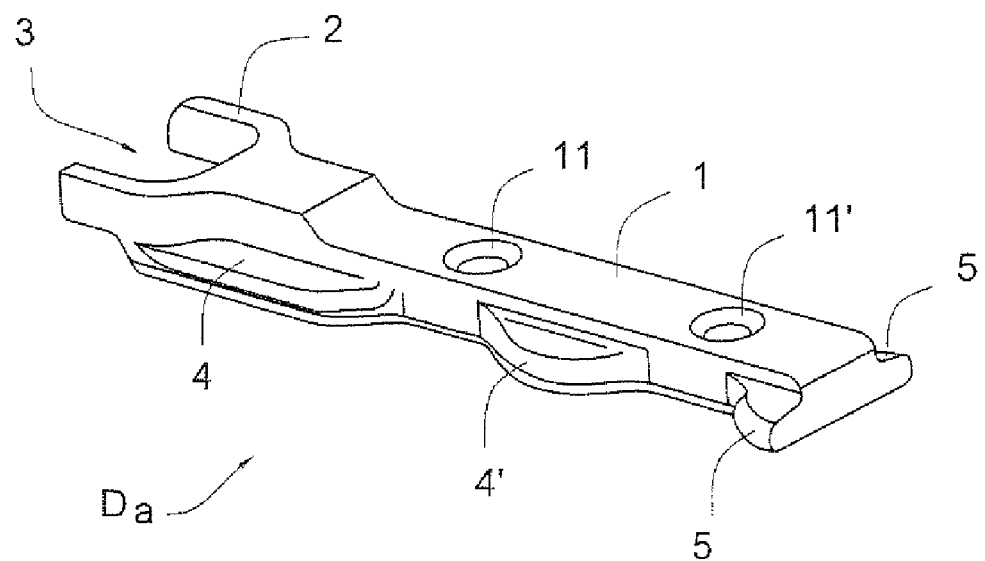
FIG. 9 is a perspective view of the aft adapter device similar to FIG. 8 but with the screw retaining discs omitted therefrom for clarity of presentation.

FIGS. 8 and 9 are perspective views of an aft adapter device $D_a$ according to an embodiment of the present invention. As shown therein, the aft adapter device $D_a$ is very similar structurally to the front adapter device $D_f$ described above in that it is comprised of similar structural parts and portions indicated by the reference numerals numbers 1 to 11. An exception is the geometric format of the fork-shaped part 2 and its defined half-opening 3. Specifically, instead of a semi-circular shape, the shape of the half-opening 3 associated with the fork-shaped part 2 of device $D_a$ is a rounded rectangular shape. In addition, the tabs 4 have a more prolonged rectangular shape that extends to the fork-shaped part 2.

In FIG. 8 the retaining discs 6, 6' were removed to allow visualization of the threaded pass-through holes 11, 11', while in FIG. 9 the retaining discs 6, 6' appear installed in place. The function of the retaining discs 6, 6' is the same as described above with reference to the forward adapter device $D_f$, thus providing locking for the whole device $D_a$ on the seat track in the longitudinal direction of the aircraft.

Figure 10A:
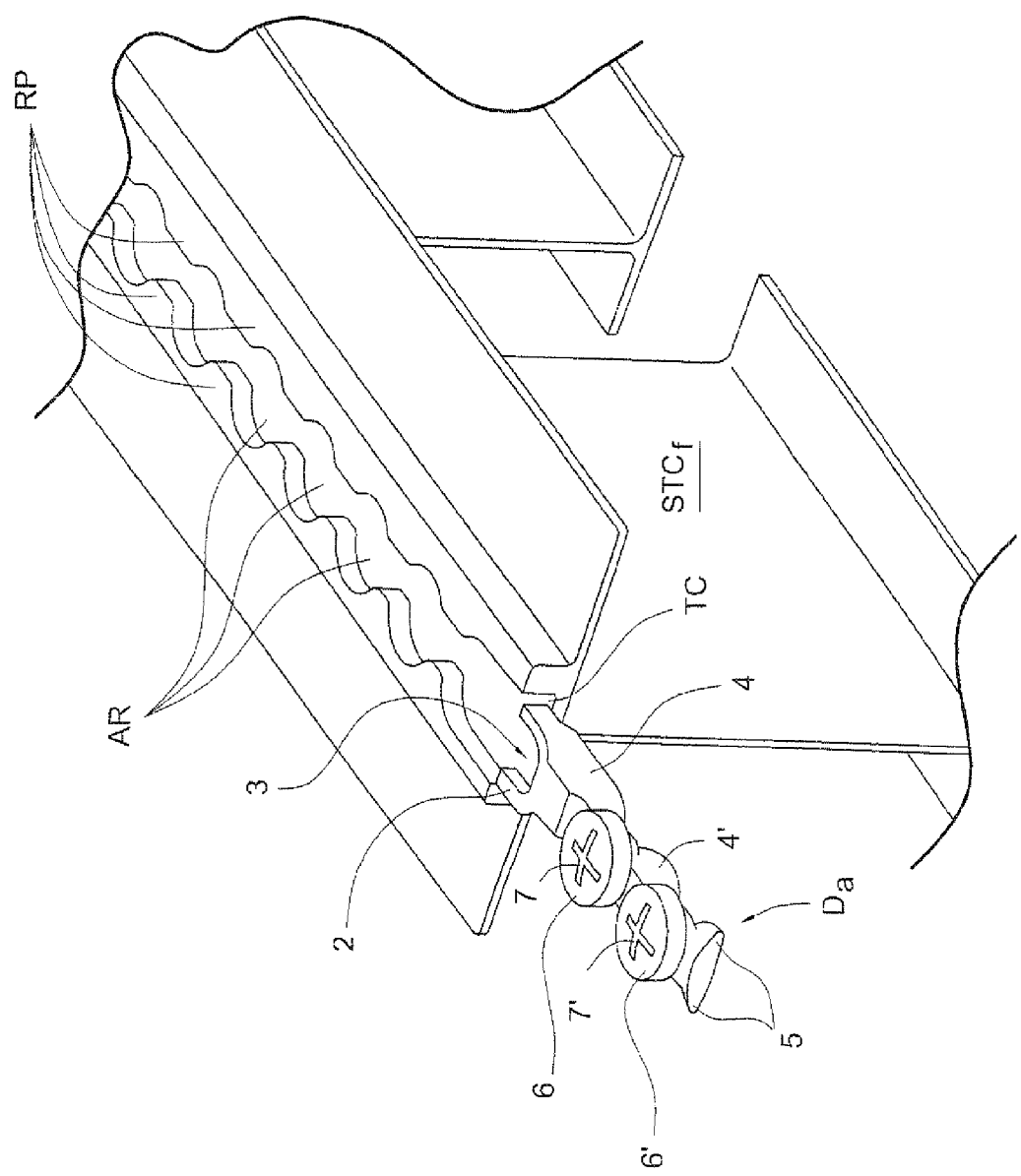
FIGS. 10A, 10B and 10C sequentially show one manner in which a seat foot may be installed at a seat track break with the adapter devices of the present invention.
Figure 10B:
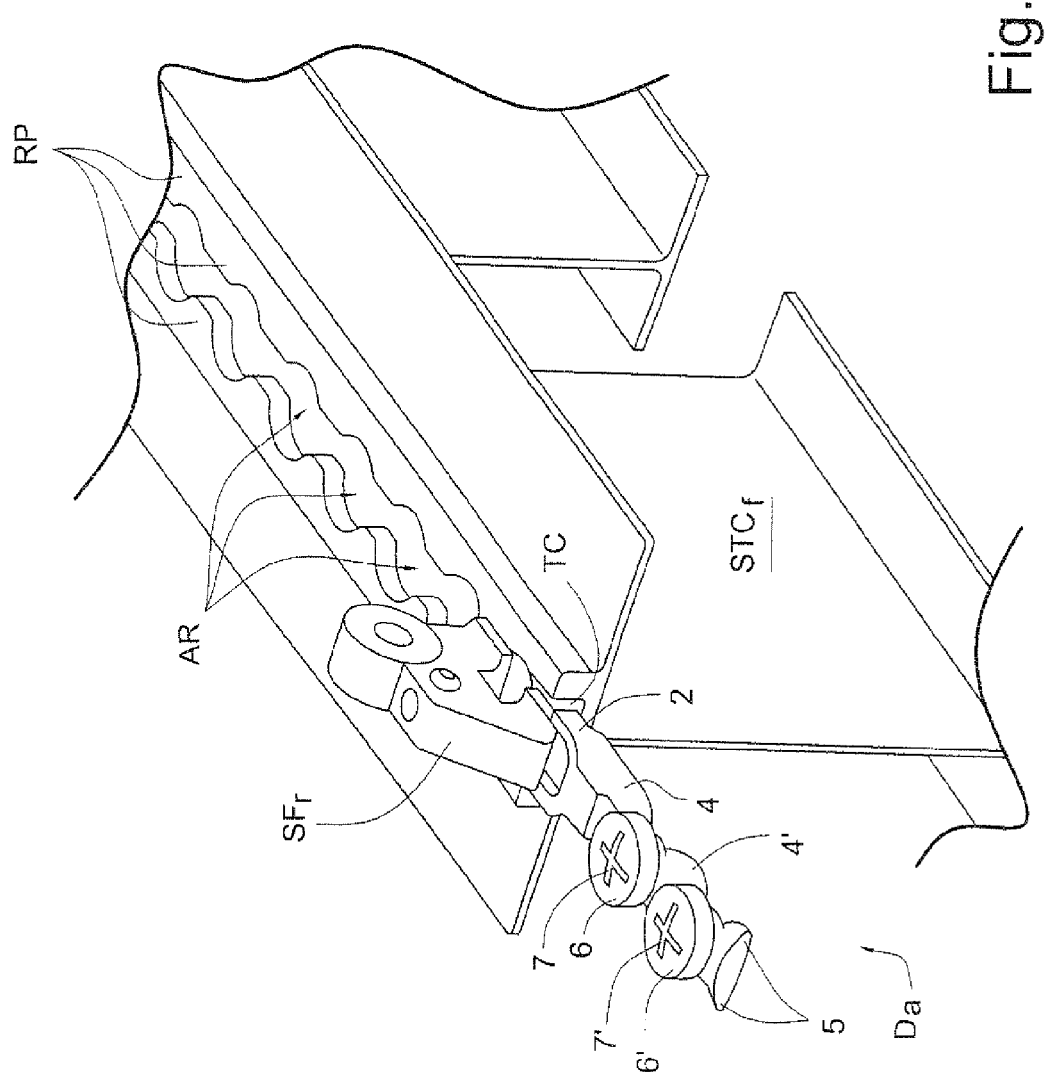
Figure 10C:
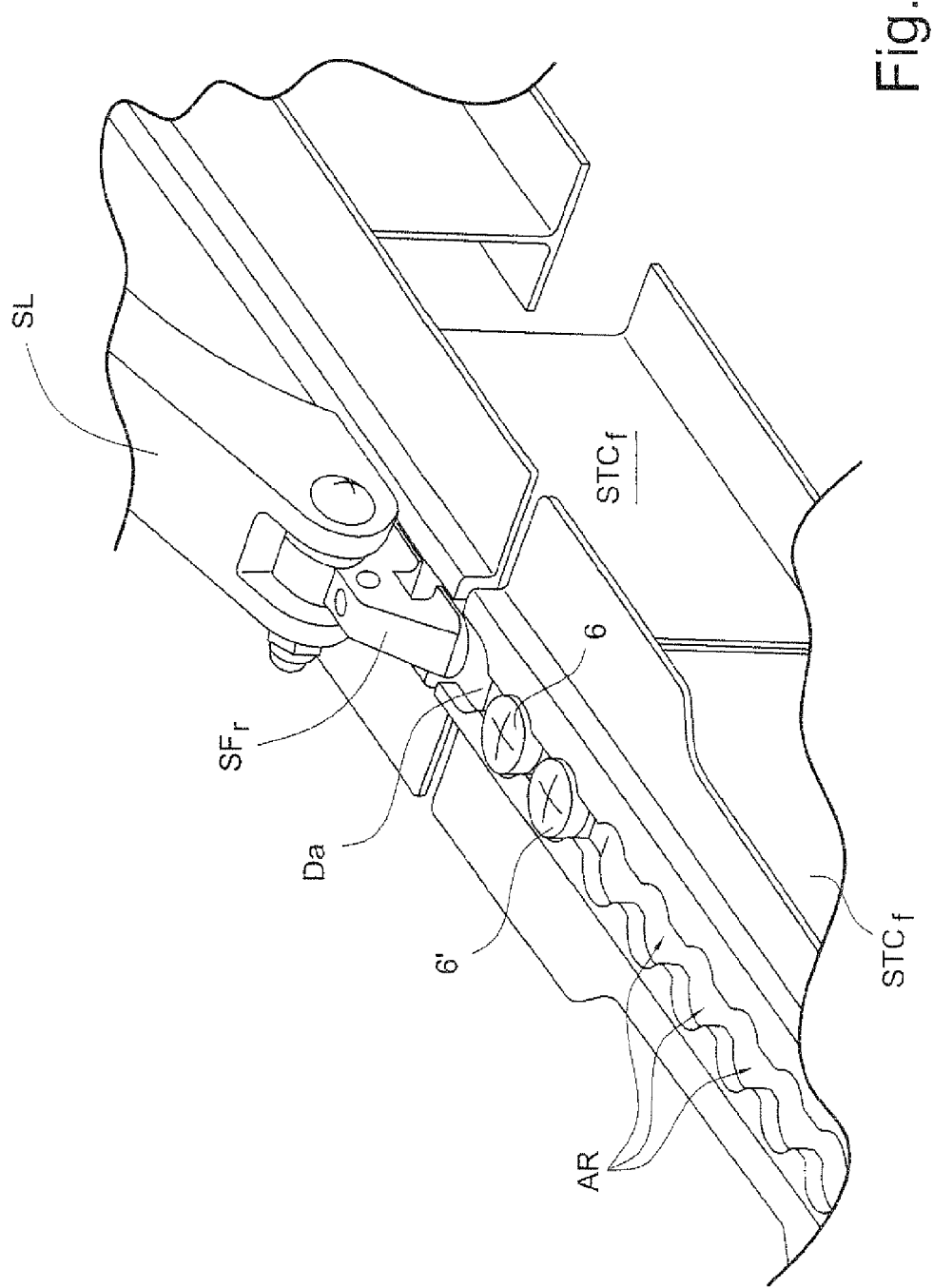

FIGS. 10A through 10C are views that illustrate the assembly of the rear foot $SF_r$ of the passenger seat PS in the device $D_a$. FIG. 10A shows the adapting device T installed relative to a front seat track section $STC_f$, it being realized that in FIG. 10A the typical support structure of the track was included with the adjacent rear track $STC_a$ omitted for better clarity. As shown in FIGS. 10A through 10C, the assembly of the rear foot $SF_r$ of the passenger seat PS requires only one adapter $D_a$. FIG. 10B shows the assemblage of FIG. 10A with addition of the rear seat foot $SF_r$ of the passenger seat PS. FIG. 10C illustrates the whole assemblage of FIG. 10B with the addition of the adjacent forward seat track section $STC_f$ and its typical support structure, and also the seat leg SL. FIGS. 10A-10C are also just schematic descriptions, but it will be noticed that no disassembly or modification of the seat/armchair is required for installation on seat track breaks is required, if the adapting device $D_a$ of the present invention is utilized.

As already mentioned, the device $D_a$ for the rear foot $SF_r$ of the seat presents a somewhat different format in relation to the device $D_f$, in that the foot fitting area formed by the part 2 and half-opening 3 of the former have a rounded rectangular shape. However, the assembly principle follows the same pattern used in the device $D_f$ for the front foot $SF_f$.

Also as already mentioned, instead of two devices, the fixation of the rear foot $SF_r$ of the passenger seat PS requires only one of the adapting devices $D_a$ instead of an opposed pair of devices $D_f$. The assembly sequence for the device $D_a$ will therefore include:

1. position and fasten the rear adapter device $D_a$ on the track; and 2. install the passenger seat by appropriately positioning the rear foot in the adapter device $D_a$.

The advantages of the adapter devices $D_f$ and $D_a$ of the present invention are already very clear in comparison to the known state of art devices, wherein:

1) the adapter devices $D_f$ and $D_a$ allow installation of seats on the seat track break areas;

2) considering the standardization of seat tracks and fasteners that exist in the aeronautical industry, the adapting devices $D_f$ and $D_a$ can be used with several types of passengers' seats and tracks, and such devices can be adapted without adversely modifying installation characteristics; and 3) as the use of the adapting devices $D_f$ and $D_a$ is very simple, they do not demand that any modification or disassembly of the seats be accomplished so that they do not affect the pre-qualification of such seats.

Instead of using only two retaining discs 6, 6' and respective screws, alternatively the present invention can include only one threaded hole 11 for only one retaining disc 6 with a screw, for fixation of devices $D_f$ and $D_a$ to the track (or, for fixation, to the division/break area of tracks). In another variation of the invention, the devices $D_f$ and $D_a$ may have a larger number of holes 11, 11' thereby allowing that more than two pieces 6, 6' with screws perform the function of fixation. Furthermore, other fixation components different from the retaining discs 6, 6' with screws can also be used, such as cotters, key lockers, rivets, etc.

Examples of particularly preferred embodiments of the invention have been described, it being understood that the scope of the present invention comprises other possible variations, so it is limited only by the claims attached, including possible equivalents thereof.

The invention claimed is:

1. An adapter device for securing an aircraft passenger seat to an aircraft fuselage seat track of the type having a channel, a plurality of spaced access regions and a plurality of retaining regions located between adjacent access regions, the adapter device comprising:
    a main body portion configured to be received within a channel of the seat track and having at least one threaded screw hole,
    a fork-shaped part which projects outwardly from one end of the main body portion and defines an arcuate engagement region,
    at least one opposed pair of tabs protruding outwardly from the main body portion, the tabs being configured to be received by a selected one of the access regions to allow for movement of the main body portion within the channel so that the tabs may be positioned in retaining engagement with a selected one of the retaining regions, and
    at least one retaining disc having a head portion and a screw portion, wherein the screw portion is threadably engageable with the screw hole of the main body portion, and wherein the head portion is sized so as to be received within one of the access regions when the screw portion is threadably engaged with the screw hole to thereby positionally retain the adapter device relative to the seat track.

2. An adapter device as in claim 1, wherein the main body portion includes a pair of half-tabs at a rear end portion thereof.

3. An adapter device as in claim 1, wherein the main body portion includes a ramp step joining the main body portion and the fork-shaped part.

4. An adapter device as in claim 1, wherein the main body portion includes an aligned pair of threaded screw holes, and wherein the adapter device comprises a pair of retaining discs, each of the retaining discs having a head portion and a screw portion, wherein the screw portion of each head portion is threadably engaged with a respective one of the screw holes.

5. An adapter device as in claim 1, wherein the main body portion includes multiple opposed pairs of tabs protruding outwardly therefrom.

6. An adapter device as in claim 1, wherein the tabs are semi-circular.

7. An adapter device as in claim 6, wherein the main body portion includes a pair of opposed half-tabs protruding outwardly therefrom at a rear end of the main body.

* * * * *